United States Patent

Ninomiya

[11] Patent Number: 5,805,232
[45] Date of Patent: Sep. 8, 1998

[54] VERTICAL SYNC SIGNAL SEPARATOR CIRCUIT AND MULTI-SYNC MONITOR USING THE SAME

[75] Inventor: Koshi Ninomiya, Kyoto, Japan

[73] Assignee: Rohm Co., Ltd., Kyoto, Japan

[21] Appl. No.: 753,017

[22] Filed: Nov. 19, 1996

[30] Foreign Application Priority Data

Nov. 24, 1995 [JP] Japan ................................ 7-329543

[51] Int. Cl.⁶ ..................................................... H04N 5/08
[52] U.S. Cl. ........................................... 348/529; 348/525
[58] Field of Search ..................... 348/529, 530, 348/525, 526, 528, 531, 532, 533, 534, 535, 500, 501, 502, 521, 522, 523, 524, 510, 511, 512; 358/153, 154, 155, 156, 157; 345/213; H04N 5/10, 5/08, 5/04

[56] References Cited

U.S. PATENT DOCUMENTS 4,313,137  1/1982  Weissmueller .......................... 348/529

FOREIGN PATENT DOCUMENTS

| 61-181276 | 8/1986 | Japan | H04N 5/10 |
| 3233279 | 10/1991 | Japan | H04N 5/10 |
| 4043769 | 2/1992 | Japan | H04N 5/10 |
| 4331574 | 11/1992 | Japan | H04N 5/10 |
| 5041817 | 2/1993 | Japan | H04N 5/10 |

*Primary Examiner*—Christopher C. Grant
*Attorney, Agent, or Firm*—Fay, Sharpe, Beall, Fagan, Minnich & McKee

[57] ABSTRACT

The present invention includes a capacitor, a charge/discharge circuit for generating a charging current having a value increasing with the increase of the frequency of the horizontal sync signal to charge the capacitor in a time period of the horizontal sync signal and a time period of the vertical sync signal. The charge/discharge circuit discharges the capacitor in other time periods to reduce a difference of the horizontal sync signal frequency. A comparator compares the voltage of the capacitor with a predetermined reference voltage to detect the vertical sync signal.

7 Claims, 4 Drawing Sheets

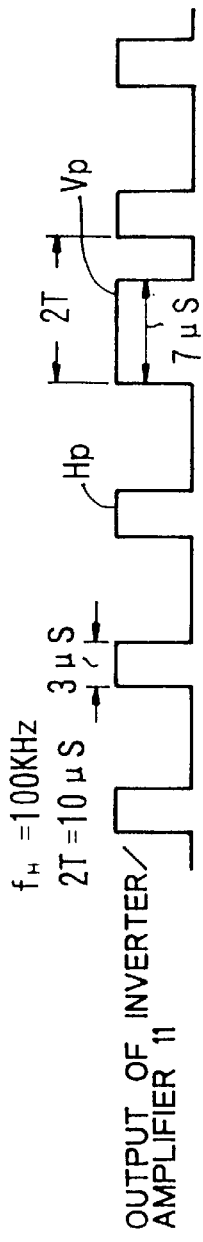
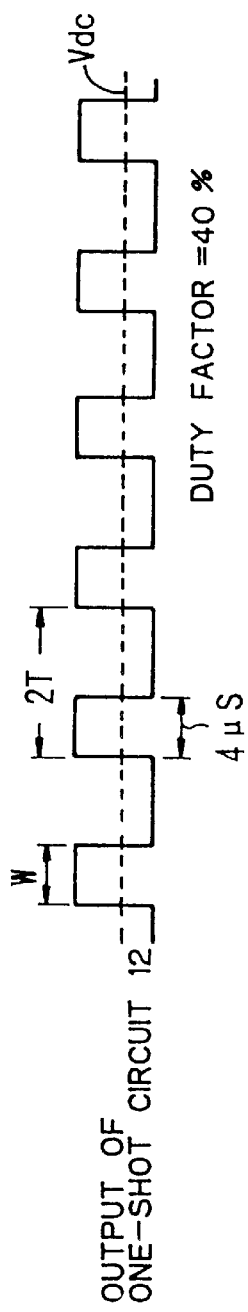
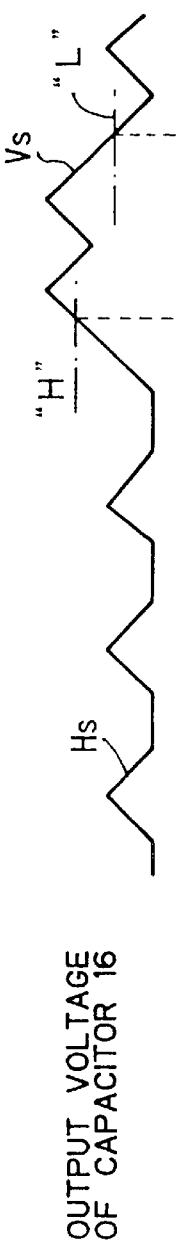
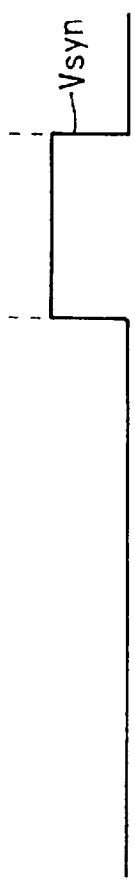
FIG. 2(e)  OUTPUT OF INVERTER/AMPLIFIER 11
FIG. 2(f)  OUTPUT OF ONE-SHOT CIRCUIT 12
FIG. 2(g)  OUTPUT VOLTAGE OF CAPACITOR 16
FIG. 2(h)  VERTICAL SYN SIGNAL OUTPUT

VERTICAL SYNC SIGNAL SEPARATOR CIRCUIT AND MULTI-SYNC MONITOR USING THE SAME

DESCRIPTION

TECHNICAL FIELD

The present invention relates to a vertical sync signal separator and a multi-sync monitor using the same and, particularly, to a vertical sync separator of a multi-sync monitor for separating, among others, a vertical sync signal from a composite video signal sent from a personal computer to a multi-sync monitor such as a multi-sync CRT display, which is capable of responding to wide horizontal and vertical sync frequency ranges and of more reliably separating the vertical sync signal in a wide frequency range.

BACKGROUND ART

A personal computer can selectively set the number of vertical and/or horizontal scan lines of a CRT display according to one of various software including Windows (registered trademark).

A high definition multi-sync CRT to be connected to such a personal computer may have a number of horizontal dots of 1200 or more and a number of vertical dots, that is, the number of vertical scan lines, of 800 or more, corresponding to the number of horizontal dots. When such vertical sync separator circuit receives a composite sync signal including a horizontal sync signal having high frequency, a vertical sync signal thereof which is to be separated takes the form of a pulse signal having a pulse width narrower than that of the horizontal sync signal of a conventional TV signal.

FIG. 3 shows an example of a vertical sync signal separator contained in a conventional multi-sync CRT.

In FIG. 3, the vertical sync signal separator has an input terminal 1a and an output terminal 1b. The vertical sync separator comprises a sync signal separator circuit 1, a vertical sync signal separator circuit 2 and a phase detector circuit 3. The sync signal separator circuit 1 receives a composite video signal supplied from a personal computer to the input terminal 1a. The sync signal separator circuit 1 separates a composite sync signal containing a vertical sync signal and a horizontal sync signal from the composite video signal and supplies the composite sync signal to the vertical sync separator circuit 2. The vertical sync separator circuit 2 separates the vertical sync signal from the composite sync signal and supplies it to the output terminal 1b. The composite sync signal separated from the composite video signal by the sync signal separator circuit 1 contains a horizontal equalizing pulse in a vertical blanking period and is supplied to the phase detector circuit 3 and a horizontal sync signal detector circuit which is not shown as a signal containing a horizontal sync signal.

The vertical sync signal separator circuit 2 comprises an integration circuit 4 for receiving the composite sync signal and a comparator 5 connected to an output of the integration circuit 4. The integration circuit 4 includes a resistor R1 and a capacitor C1. The comparator 5 has a (−) input supplied with a reference voltage from a reference voltage source 6 and a (+) input supplied with an integrated voltage value from the integration circuit 4.

In the vertical sync signal separator circuit 2 constructed as mentioned above, the vertical sync signal is detected by detecting a voltage having a value larger than that of the horizontal sync signal during the vertical sync signal period and generated by integrating by the integration circuit 4 the vertical sync signal under a condition that the pulse width of the vertical sync signal is larger than that of the horizontal sync signal.

In the multi-sync CRT in which high definition display is possible and which can synchronize with the horizontal sync signal frequency in a range, for example, from 15 kHz to 200 kHz, however, the pulse width of the vertical sync signal is reduced with increase of the horizontal sync signal frequency.

In detail, in a case where the duty factor of the horizontal sync signal is about 30% and that of the vertical sync signal is about 70% with the horizonal sync signal frequency of the composite sync signal supplied to the vertical sync signal separator circuit being a reference, the pulse width of 1 pulse (1 H) of the horizontal sync signal is 20 $\mu$s and that of 1 pulse (1$V_{syn}$) of the vertical sync signal is 46.7 $\mu$s at the horizontal sync signal frequency of 15 kHz. At the horizontal sync signal frequency of 80 kHz, 1 H is about 3.75 $\mu$s and 1$V_{syn}$ is about 8.75 $\mu$s. At the horizontal sync signal frequency of 200 kHz, 1 H is about 1.5 $\mu$s and 1$V_{syn}$ is about 3.5 $\mu$s.

Therefore, in the multi-sync monitor, the pulse width of the vertical sync signal when a high horizontal sync signal frequency is received is narrower than that of the horizontal sync signal when a low horizontal sync signal frequency is received. Consequently, it becomes impossible to separate the vertical sync signal from the composite sync signal.

In order to avoid such situation, it may be considered to switch the time constant of the integration circuit correspondingly to the horizontal sync signal frequency of the composite sync signal. In such case, however, a detection circuit for detecting the horizontal sync signal frequency and a switch circuit for switching the time constant of the integration circuit according to the horizontal sync signal frequency detected by the detection circuit are necessary and an erroneous detection of the vertical sync signal may occur since the time constant has a selected value.

SUMMARY OF THE INVENTION

An object of the present invention is to provide a vertical sync signal separator circuit capable of reliably separating a vertical sync signal from a composite sync signal including a horizontal sync signal having frequency in a wide frequency range and a multi-sync monitor using the same vertical sync signal separator.

In order to achieve the above object, according to the present invention, a vertical sync signal separator for separating a vertical sync signal from one of a plurality of composite sync signals each containing a horizontal sync signal having a different frequency and the vertical sync signal having a frequency set according to the horizontal sync signal frequency comprises a capacitor, a charge/discharge circuit for generating a charging current which increases correspondingly to an increase of horizontal sync signal frequency to charge the capacitor in a period of the horizontal sync signal and in a period of the vertical sync signal and to discharge the capacitor in period other than the sync signal periods to thereby reduce a difference in charging voltage of the capacitor due to difference in horizontal sync signal frequency and comparator for detecting the vertical sync signal by comparing a voltage of the capacitor with a predetermined reference voltage.

A multi-sync monitor according to the present invention comprises the vertical sync signal separator.

As above mentioned, according to the present invention, the charging current which increases with increase of the horizontal sync signal frequency is supplied to the capacitor so that a charging voltage compatible with a charging voltage for a low horizontal sync signal frequency is generated thereacross even if the pulse width of the horizontal sync signal as well as the vertical sync signal is reduced, to thereby restrict a variation of the charging voltage due to difference in the horizontal sync signal frequency. The vertical sync signal is detected when the comparator determines that the pulse width of the vertical sync signal is larger than that of the horizontal sync signal, as in the conventional manner.

In the present invention, the charge/discharge circuit comprises a one-shot circuit responsive to the vertical sync signal and the horizontal sync signal of the composite sync signal to generate a pulse voltage having a predetermined pulse width and an integrator circuit for integrating the pulses output from the one-shot circuit to generate a predetermined DC voltage signal. The DC voltage signal is converted into a current with which the capacitor is charged. The capacitor is discharged when there is no vertical and horizontal sync signals received by the charge/discharge circuit.

As mentioned, the one-shot circuit generates the pulse signal having a constant pulse width corresponding to the composite sync signal, regardless of the horizontal sync signal frequency of the composite sync signal. The pulse signal from the one-shot circuit, which has the constant pulse width in only a period of the horizontal sync signal of the composite sync signal, is integrated by the integrator circuit, resulting in the DC voltage signal corresponding to the horizontal sync signal frequency. The capacitor is charged with a current value corresponding to a voltage value of the DC voltage signal. Therefore, although a charging time becomes short when the horizontal sync signal frequency is high, the capacitor is charged with a large charging current by increasing the voltage value of the DC voltage signal, resulting in a high charge voltage of the capacitor. On the contrary, although the charging time becomes long when the horizontal sync signal frequency is low, the capacitor is charged with a small charging current by reducing the voltage value of the DC voltage, resulting in a high charge voltage of the capacitor.

As a result, the difference in charge voltage of the capacitor in the time period of the vertical and horizontal sync signals of the composite sync signal, which is caused by the difference in horizontal sync signal frequency, is eventually cancelled out. On the other hand, the duty cycle of the horizontal sync signal at any frequency is 50% or less under current TV standards in major countries and the duty cycle of the vertical sync signal is 50% or more. Therefore, a peak value of the vertical sync signal is higher than that of the horizontal sync signal for any horizontal sync signal frequency.

By comparing the voltage of the capacitor with a reference value of the comparator, it is possible to detect the vertical sync signal without influence of the frequency of the horizontal sync signal. The reference value in such case is set to a value which is larger than the peak value of the charge/discharge voltage value generated in the period of the horizontal sync signal and smaller than the peak value of the charge/discharge voltage value generated in the period of the vertical sync signal.

As a result, it is possible to realize the vertical sync signal separator circuit or the multi-sync monitor using the same which can separate the vertical sync signal from the composite sync signal containing the horizontal sync signal having frequency in a wide frequency range.

DESCRIPTION OF THE PREFERRED EMBODIMENTS

Figure 1:
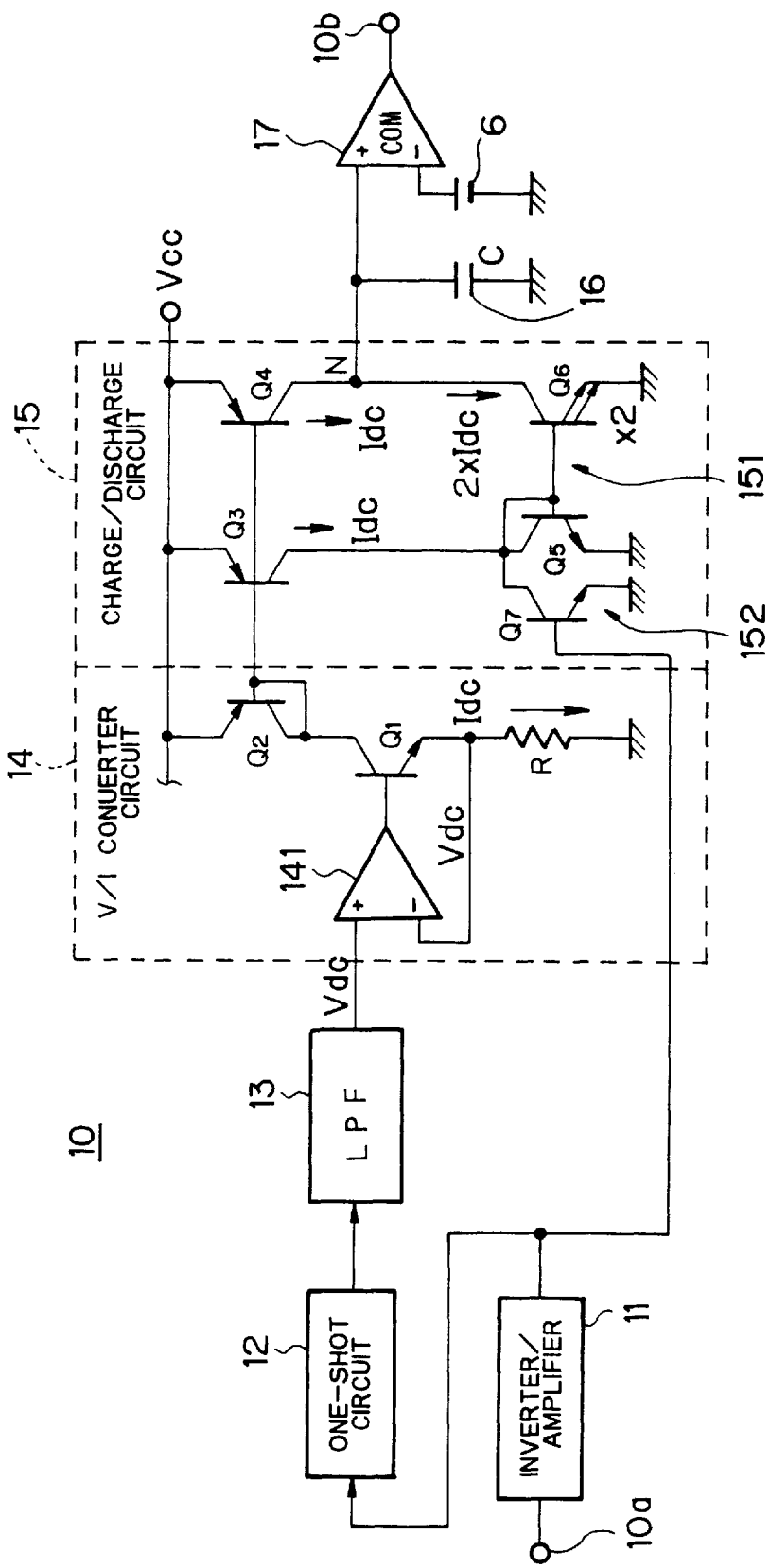
FIG. 1 is a block circuit diagram according to an embodiment of a vertical sync signal separator of the present invention.
Figure 2A:
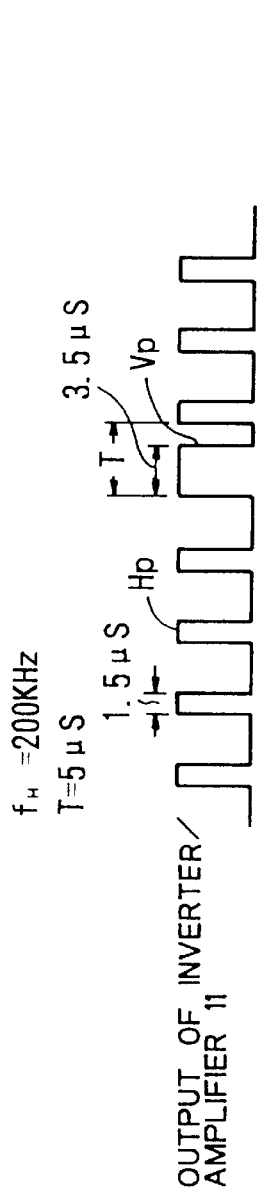
FIG. 2 shows waveforms for explaining an operation of the embodiment shown in FIG. 1.
Figure 2B:
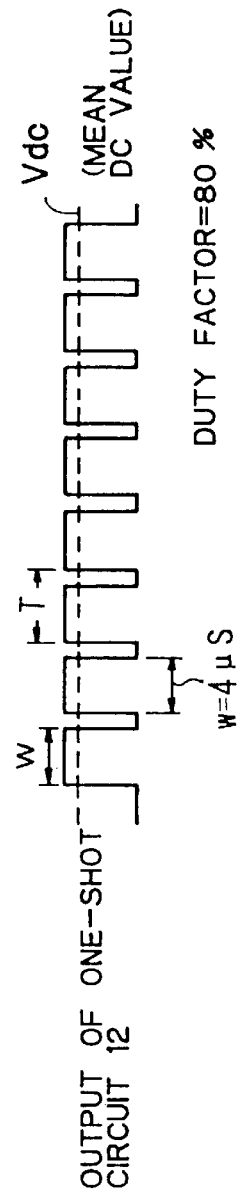
Figure 2C:
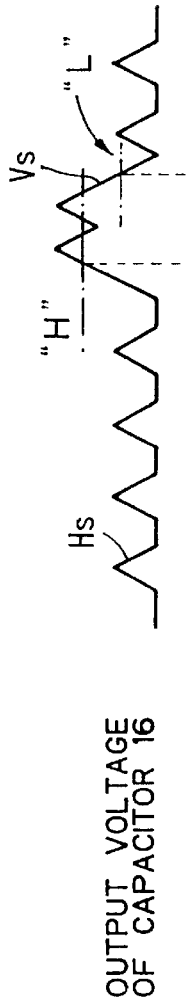
Figure 2D:

A vertical sync signal separator circuit 10 according to an embodiment of the present invention comprises an inverter/amplifier 11, a one-shot circuit 12, a low-pass filter (LPF) 13, a voltage/current (V/I) converter circuit 14, a charge/discharge circuit 15, a charging capacitor (C) 16 and a hysterisis comparator (COM) 17.

Figure 3:
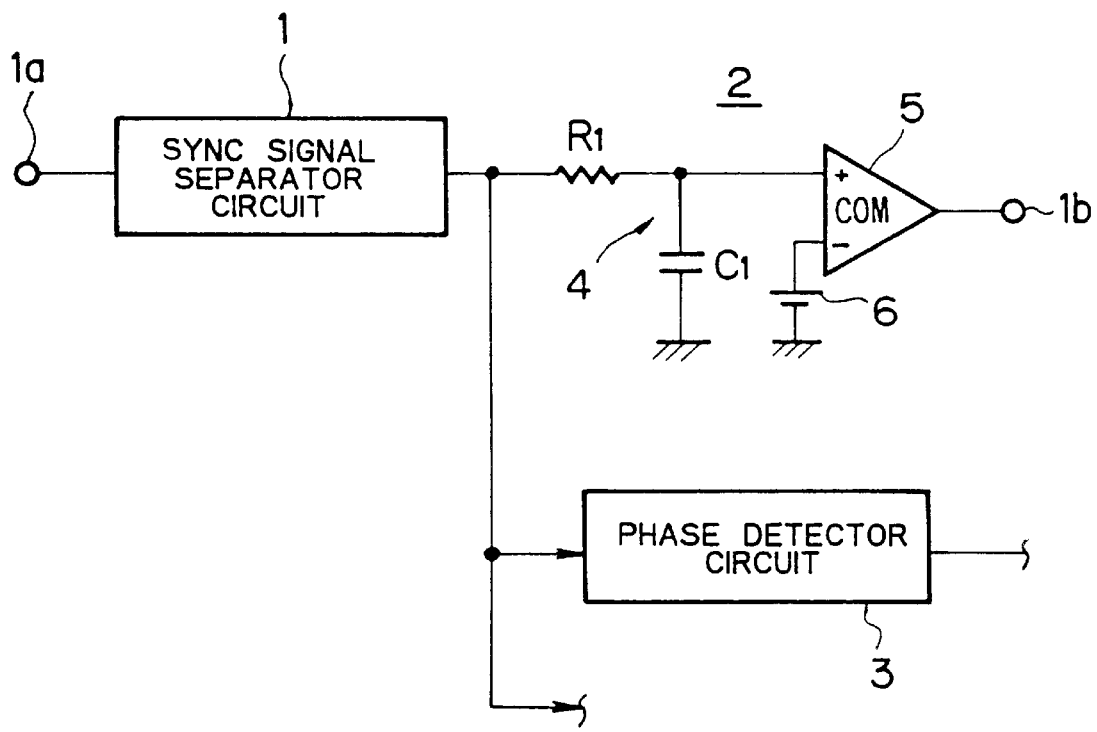
FIG. 3 is a circuit diagram of a conventional sync signal separator circuit having a vertical sync signal separator circuit.

The inverter/amplifier 11 has an input terminal 10*a* supplied with a composite sync signal containing a vertical and horizontal sync signals from a sync signal separator circuit 1 shown in FIG. 3, inverts/amplifies the composite sync signal and outputs a positive pulse signal such as shown by (a) in FIG. 2.

The one-shot circuit 12 is triggered by a leading edge of the output pulse from the inverter/amplifier 11 to generate a pulse having a predetermined pulse width W in a period corresponding to the sync signal. The pulse width W of the output of the one-shot circuit 12 is determined with using, as a reference, a period T which is determined by a maximum horizontal frequency which can be received by a multi-sync CRT housing the sync signal separator 10 as a frequency of the horizontal sync signal. The width W may be set to be equal to or more than a duty factor of the vertical sync signal $V_P$ (see FIG. 2). For example, when the duty factor of the vertical sync signal $V_P$ is 70%, the pulse width W may be set to have a duty factor of 80%. With this scheme, it is possible to generate a DC voltage signal, which is stable over a range of the pulse width W or more, during a period in which the vertical sync signal exists, correspondingly to the vertical sync signal of the composite sync signal having the horizontal sync signal having maximum frequency. As a result, it is possible to supply a charging voltage having a high peak value to the capacitor (C) 16 for the vertical sync signal even if the composite sync signal having the horizontal sync signal having maximum frequency is received.

For the vertical sync signal of the composite sync signal including the horizontal sync signal having a frequency lower than the maximum horizontal sync signal frequency, the pulse width thereof is further increased although the value of the DC voltage becomes smaller. Therefore, it is possible to supply the charging voltage having high peak value to the capacitor 16 similarly even if the DC voltage value varies more or less. Since, as will be described in detail, the charging current value itself is reduced with decrease of the horizontal sync signal frequency, the peak value of the charging voltage for the vertical sync signal is not changed substantially practically even if the horizontal sync signal frequency is changed.

On the other hand, under the current TV standards, etc., in various countries, the duty factor of the horizontal sync signal is 50% at most and the duty factor of the vertical sync signal is at least 50%. Therefore, the peak value of the vertical sync signal is higher than that of the horizontal sync signal for any horizontal sync signal frequency.

The output waveform (a) in FIG. 2 is obtained when the horizontal sync signal frequency $f_H$ is 200 kHz (this frequency is assumed as the maximum horizontal sync signal frequency). Since its period T=5 μs, the width W of the output pulse of the one-shot circuit 12 becomes 0.8×5=4 μs, where the duty factor of the output pulse being 80% and the maximum horizontal sync signal frequency period being T. Thus, the one-shot circuit 12 may output a pulse signal (b) shown in FIG. 2 which corresponds to the sync signal input having pulse width of 4 μs. In FIG. 2, the vertical sync signal $V_P$ has a pulse width of 3.5 μs, with the duty factor of 30% using the period T as the reference and the horizontal sync signal $H_P$ has a pulse width of 1.5 μs, with the duty factor of 30% using the period T as the reference.

The low-pass filter 13 serves as an integration circuit which integrates the output pulse signal of the one-shot circuit 12 to generate a mean DC voltage shown by a dotted line $V_{dc}$ in FIG. 2, with the maximum horizontal sync signal frequency being 200 kHz.

The V/I converter circuit 14 converts the voltage value $V_{dc}$ into a current value which is supplied to the charge/discharge circuit 15. The V/I converter circuit 14 comprises a buffer amplifier 141 composed of a differential amplifier having an input terminal connected to the output terminal of the low-pass filter 13, an NPN transistor Q1 having a base connected to an output of the buffer amplifier 141 and a resistor R connected between an emitter of the NPN transistor Q1 and ground GND. An emitter voltage of the NPN transistor Q1. A NPN transistor Q2 is connected between a collector of the NPN transistor Q1 and a power source line $V_{cc}$ as a diode-connected load transistor. The transistor Q2 is used as the input side transistor constituting a current mirror circuit and has a base connected to bases of output side transistors Q3 and Q4 of the current mirror circuit, which are provided in the charge/discharge circuit 15. Thus, currents each substantially equal to a current flowing in the transistor Q2 flow through collector-emitter circuits of the respective transistors Q3 and Q4 and output therefrom as output currents.

The output currents of the transistors Q3 and Q4 of the charge/discharge circuit 15 flow through respective transistors Q5 and Q6 which constitute the current mirror circuit to the ground GND. A junction N between the transistors Q4 and Q6 is connected to a charging side terminal of the capacitor 16 as an output of the charge/discharge circuit 15. Thus, the transistors Q3 to Q6 produce a charging current and a discharging current having a value equal to that of the charging current at the junction N as to be described in detail later. The charging current is supplied to the capacitor 16 only during a time period where the horizontal and vertical sync signals exist and the discharging current flows from the capacitor 16 to the ground GND only during a time period where there is neither the vertical sync signal nor the horizontal sync signal.

As a result, the capacitor 16 generates a voltage waveform $H_s$ and a voltage waveform $V_S$ shown by (c) in FIG. 2 correspondingly to the horizontal sync signal $H_P$ and to the vertical sync signal $V_P$, respectively, when the maximum horizontal sync signal frequency is 200 kHz. The waveforms of these voltages will be described.

These waveforms are determined by the charging and discharging current values of the charge/discharge circuit 15 and a capacitance of the capacitor 16. The charging current value and the discharging current value are set by selecting a value of the resistor R connected to the emitter of the transistor Q1 of the V/I converter circuit 14. Assuming that the charge/discharge current is constant and represented by $I_{dc}$, the charge/discharge current $I_{dc}$ becomes $V_{dc}/R$, where R is the resistance value of the resistor R and $V_{dc}$ is an output voltage of the low-pass filter 13.

As a result, it is possible to obtain a high charging voltage during the period of the vertical sync signal $V_P$ and a low charging voltage during the period of the horizontal sync signal $H_P$ by selecting the capacitance value of the capacitor 16 and the resistance value of the resistor R, as shown by the waveform (c) in FIG. 2. The charge on the capacitor is discharged during the period in which there is no sync signal. Thus, the capacitor 16 provides a voltage which has different values in the periods of the vertical and horizontal sync signals.

The hysterisis comparator 17 has a high level threshold value H and a low level threshold value L as shown by the waveform (c) in FIG. 2. The threshold value H is in a level close to a bottom of a valley between two peaks generated in a center portion of the voltage waveform $V_S$ during the period of the vertical sync signal $V_P$ and the threshold value L corresponds to about a peak level of the horizontal sync signal $H_P$. Thus, a vertical sync signal $V_{syn}$ shown by a waveform (d) in FIG. 2 is generated at an output terminal 10b of the comparator 17.

The construction and an operation of the charge/discharge circuit 15 will be described. The diode-connected transistor Q2 of the V/I converter circuit 14 serves as the input side load of the current mirror circuit constituted with the transistors Q3 and Q4 of the charge/discharge circuit 15. The output side transistors Q3 and Q4 of the current mirror circuit have emitters connected to the power source line $V_{cc}$ and collectors connected to the ground GND through a current mirror load 151 composed of the diode-connected NPN transistor Q5 and the NPN transistor Q6. An emitter area of the transistor Q6 is twice that of the transistor Q5, so that the transistor Q6 can flow a current twice that of the transistor Q5. A switch circuit 152 composed of an NPN transistor Q7 is connected between the collector of the transistor Q5 and the ground GND. The transistor Q7 has a base supplied with the sync signals corresponding to the vertical and horizontal sync signals from the inverter/amplifier 11. Further, the transistor Q7 has an emitter connected to the ground GND so that it becomes conductive state only during the period in which there is the sync signal.

Since the transistors Q5 and Q6 of the current mirror circuit 151 are in OFF state during the conductive period of the transistor Q7, the current $I_{dc}$ of the transistor Q4 is supplied to the capacitor 16 as the charging current. Since the capacitor 16 is charged with the constant current $I_{dc}$, the voltage of the capacitor 16 becomes a sawtooth waveform as shown by the waveform (c) in FIG. 2. Further, since the time period in which the transistor Q7 is conductive is the time period in which the sync signal exists, the charging time of the capacitor 15 becomes shorter for the horizontal sync signal $H_P$, while the charging time of the capacitor 15, in which the vertical sync signal $V_P$ exists, is longer. On the other hand, since the transistors Q5 and Q6 of the current mirror circuit 151 are in an ON state during an OFF period of the transistor Q7, a current $2 \times I_{dc}$ which is twice the current of the transistor Q5 flows through the transistor Q6. As a result, the transistor Q6 sinks the current $I_{dc}$ of the transistor Q4 and the current $I_{dc}$ of the capacitor 16 and, since the sink current becomes $2 \times I_{dc}$, the discharging current of the capacitor 16 becomes $I_{dc}$. That is, the discharge is started from the peak of the charging current with a discharging rate which is the same as that of the charging rate in an opposite direction to the charging direction, resulting in the voltage waveform (c) of the capacitor 16 as shown in FIG. 2.

When the horizontal sync signal frequency of the composite sync signal is high, the output voltage $V_{dc}$ of the low-pass filter 13 is high. Therefore, the charge/discharge current $I_{dc}$ becomes large with high changing rate. On the other hand, when the horizontal sync signal frequency of the composite sync signal is low, the changing rate of the charge/discharge current is low as will be described.

In a case where the horizontal sync signal frequency of the composite sync signal is changed from 200 kHz to 100 Hz, a sync signal having a period of 10 μs which is twice the period T for the horizontal sync signal having frequency of 200 kHz is generated as shown by (e) in FIG. 2 and the pulse width of the horizontal sync signal $H_P$ becomes 3 μs which is also twice. However, the pulse width W of the output of the one-shot circuit 12 is unchanged although its period becomes 2T=10 μs, as shown by (f) in FIG. 2.

As a result, the output voltage $V_{dc}$ of the low-pass filter 13 is lowered to a level shown by a dotted line. Therefore, the charge/discharge current $I_{dc}$ is reduced to $V_{dc}/R$. Consequently, the capacitor 16 is charged/discharged with a current which is smaller than that in the former case. In this case, the charging rate and discharging rate become lower than those in the former case as shown by the waveform (g) in FIG. 2 and the vertical and horizontal sync signals become broader in the time axis direction.

Therefore, the peak level of the charging voltage for the horizontal and vertical sync signals is not changed substantially even if the horizontal sync signal frequency is changed. As a result, as in the former case, it is possible to obtain the vertical sync signal $V_{syn}$ shown by (h) in FIG. 2 as the output of the comparator 17.

As described, even if the horizontal sync signal frequency of the composite sync signal is changed, the present circuit performs the charging/discharging by changing the charging/discharging current value corresponding to the change of the horizontal sync signal frequency. Therefore, the variation of the voltage level of the capacitor 16 can be restricted. As a result, even when a composite sync signal having a different horizontal sync signal frequency is received, it is possible to separate a vertical sync signal $V_{syn}$ therefrom by means of the comparator 17.

It should be noted that the described charge/discharge circuit is a mere example and it is possible to realize a similar charge/discharge circuit by using NPN transistors and PNP transistors instead of the described PNP transistors and the described NPN transistors, respectively.

The described hysteresis comparator may be changed to a comparator having one threshold value.

What is claimed is:

1. A vertical sync signal separator circuit responsive to one of a plurality of composite sync signals each containing a horizontal sync signal having a different frequency and a vertical sync signal set correspondingly to the horizontal sync signal for separating the vertical sync signal from the composite sync signal, comprising:

a capacitor;

a charge/discharge circuit for generating a charging current having a value increasing with increase of the frequency of the horizontal sync signal to charge said capacitor in a time period of the horizontal sync signal and a time period of the vertical sync signal and discharging said capacitor in other time periods than the time periods to reduce a difference of the horizontal sync signal frequency;

a comparator for comparing the voltage of said capacitor with a predetermined reference voltage to detect the vertical sync signal; and a one-shot circuit for generating a pulse having a predetermined pulse width correspondingly to the vertical sync signal and the horizontal sync signal of the composite sync signal and an integrator circuit for integrating an output of said one-shot circuit to produce a certain DC voltage signal and wherein said charge/discharge circuit charges said capacitor with a current having a value corresponding to a voltage value of the certain DC voltage signal during the time periods of the vertical sync signal and the horizontal sync signal of the composite sync signal and discharges said capacitor during other time periods than the time periods.

2. A vertical sync signal separator circuit as claimed in claim 1, wherein a duty factor of the vertical sync signal is larger than that of the horizontal sync signal.

3. A vertical sync signal separator circuit as claimed in claim 2, further comprising a voltage/current converter circuit for converting the certain DC voltage signal into a current value and wherein the pulse generated by said one-shot circuit has a predetermined duty factor with respect to a period thereof at the maximum frequency of the frequencies of the horizontal sync signal, the predetermined duty factor being equal to or larger than a duty factor of the vertical sync signal.

4. A vertical sync signal separator circuit as claimed in claim 3, wherein said integrator circuit is a low-pass filter, said voltage/current converter circuit includes a diode-connected transistor and said charge/discharge circuit includes transistors, said diode-connected transistor of said voltage/current converter circuit and said transistors of said charge/discharge circuit constituting a current mirror circuit, said charge/discharge circuit being adapted to charge said capacitor through said current mirror circuit and discharge said capacitor at substantially the same rate as a charging rate of said capacitor.

5. A vertical sync signal separator circuit as claimed in claim 3, wherein said voltage/current circuit comprises a buffer amplifier having an input supplied with the certain DC voltage signal and a transistor having a base supplied with an output of said buffer amplifier and having said diode-connected transistor as its load, and wherein said comparator is a hysterisis comparator.

6. A multi-sync monitor comprising a vertical sync signal separator circuit responsive to one of a plurality of composite sync signals each containing a horizontal sync signal having a different frequency and a vertical sync signal set correspondingly to the horizontal sync signal for separating the vertical sync signal from the composite sync signal, said vertical sync signal separator circuit comprising:

a capacitor;

a charge/discharge circuit for generating a charging current having a value increasing with increase of the frequency of the horizontal sync signal to charge said capacitor in a time period of the horizontal sync signal and a time period of the vertical sync signal and discharging said capacitor in other time periods than the time periods to reduce a difference of the horizontal sync signal frequency; and a comparator for comparing the voltage of said capacitor with a predetermined reference voltage to detect the vertical sync signal;

wherein said vertical sync signal separator circuit further comprises a one-shot circuit for generating a pulse having a predetermined pulse width correspondingly to the vertical sync signal and the horizontal sync signal of the composite sync signal and an integrator circuit for integrating an output of said one-shot circuit to produce a certain DC voltage signal and said charge/ discharge circuit charges said capacitor with a current having a value corresponding to a voltage value of the certain DC voltage signal during the time periods of the vertical sync signal and the horizontal sync signal of the composite sync signal and discharges said capacitor during other time periods than the time periods.

7. A multi-sync monitor as claimed in claim 6, wherein said vertical sync signal separator circuit further comprises a voltage/current converter circuit for converting a voltage value of the certain DC voltage signal into a current value, a duty factor of the vertical sync signal is larger than that of the horizontal sync signal and the pulse generated by said one-shot circuit has a predetermined duty factor with respect to a period thereof at the maximum frequency of the frequencies of the horizontal sync signal, the predetermined duty factor being equal to or larger than a duty factor of the vertical sync signal.

* * * * *